United States Patent
Lee et al.

(10) Patent No.: US 7,954,988 B2
(45) Date of Patent: Jun. 7, 2011

(54) SCANNER MODULE AND IMAGE SCANNING APPARATUS EMPLOYING THE SAME

(75) Inventors: Dong Hun Lee, Seoul (KR); Gyung Mo Tahk, Seoul (KR); Hyun Surk Kim, Yongin-Si (KR); Kyung Rok Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 245 days.

(21) Appl. No.: 12/183,691

(22) Filed: Jul. 31, 2008

(65) Prior Publication Data

US 2009/0034285 A1 Feb. 5, 2009

(30) Foreign Application Priority Data

Jul. 31, 2007 (KR) .................. 10-2007-0076640
Jul. 4, 2008 (KR) .................. 10-2008-0065048

(51) Int. Cl.
*F21V 7/04* (2006.01)
*G02B 6/10* (2006.01)
(52) U.S. Cl. ......... 362/555; 362/551; 362/628; 362/612
(58) Field of Classification Search .................. 362/555, 362/551, 800, 602, 612, 613, 628, 558, 582; 385/133, 146, 901; 355/67–71
See application file for complete search history.

(56) References Cited

U.S. PATENT DOCUMENTS

| 5,295,047 | A  | * | 3/1994 | Windross | 362/551 |
| 6,357,903 | B1 |   | 3/2002 | Furusawa et al. | |
| 6,612,730 | B1 | * | 9/2003 | Ikeda | 362/558 |
| 6,902,309 | B2 | * | 6/2005 | Uemura et al. | 362/555 |
| 7,076,148 | B2 | * | 7/2006 | Nemoto et al. | 362/610 |
| 7,088,905 | B1 | * | 8/2006 | Nemoto et al. | 362/610 |
| 7,284,891 | B2 | * | 10/2007 | Saito et al. | 362/615 |
| 7,367,507 | B2 | * | 5/2008 | Chen et al. | 235/454 |
| 7,555,194 | B2 | * | 6/2009 | Ikeda et al. | 385/146 |
| 2007/0273940 | A1 | * | 11/2007 | Chen | 358/509 |

\* cited by examiner

*Primary Examiner* — Bao Q Truong
(74) *Attorney, Agent, or Firm* — Stanzione & Kim, LLP

(57) ABSTRACT

A scanner module and an image scanning apparatus employ an illuminator that includes at least one light emitting diode, a light guide to change the direction of the light from the light emitting diode, and a light source holder to which the light emitting diode is mounted, the light source holder being positioned in relation to the light guide such that the light source holder covers an incidence face of the light guide, on which the light from the light source is incident, the surface of light source holder facing the incidence face reflecting light incident thereupon. The reflection of light by the light source holder reduces the possibility of leakage of light, and can enhance luminous intensity of light of the illuminator.

14 Claims, 15 Drawing Sheets

US 7,954,988 B2

SCANNER MODULE AND IMAGE SCANNING APPARATUS EMPLOYING THE SAME

CROSS-REFERENCE TO RELATED APPLICATION

This application claims the benefit of Korean Patent Application No. 2007-0076640, filed on Jul. 31, 2007, and Korean Patent Application No. 10-2008-0065048 filed on Jul. 4, 2008, and under 35 U.S.C. §120 of U.S. patent application Ser. No. 12/118,856 filed on May. 12, 2008, the disclosure of each of which is incorporated herein by reference in its entirety.

BACKGROUND OF THE INVENTION

1. Field of the Invention

The present invention relates to a scanner module and an image scanning apparatus employing the scanner module, and, more particularly, to a mounting structure of a light guide in a scanner module.

2. Description of the Related Art

Generally, a scanner module may be employed in an image reading apparatus to read image from a desired portion of a document. To this end, a scanner module may include an illuminator to irradiate light to the portion of the document to be read and a focusing lens to focus the light reflected from the portion of the document on an image sensor.

With recent development of inexpensive high-luminous-intensity white light emitting diodes, a scanner module employing white light emitting diodes as the light source has been developed.

An illuminator however also needs to have an appropriate light distribution to provide a uniform image output for each pixel. For this reason, a light guide has been used to guide light, irradiated from light emitting diodes, to the desired illuminating position.

An example of an illuminator that employs light emitting diodes and a light guide, is disclosed in U.S. Pat. No. 6,357,903 B1 to Furusawa et al. ("Furusawa"), which was issued on Mar. 19, 2002).

In legacy illuminators, e.g., one described by Furusawa, a light source is provided at one end of an elongated transparent light guide that is mounted in a case by being slid lengthwise into the case. During the lengthwise insertion onto the case, damages to the light guide suffer, e.g., scratches, or the like, which may have adverse effect on the scanning performance. In addition, there is no structure to guide the light guide into the proper mounting position, exacerbating the possibility of damages, and resulting in imprecise assembly.

When light emitting diodes are used as the light source of an illuminator, the luminous intensity may be limited to a predetermined level. While a higher current or voltage is supplied to the light emitting diodes may result in the light emitting diodes producing light with enhanced luminous intensity, the increased power also raises the temperature of the light emitting diodes, and, consequently, may deteriorate the luminous intensity of light actually emitted by the light emitting diodes.

Moreover, it is desirable that an illuminator be easy to assemble so as to allow mass production. A conventional light guide is formed as an elongated transparent member, which is prone to bending or bowing. It is thus also desirable to provide a guide holder that is capable of supporting the light guide while maintaining the light guide straight.

Furthermore, in the above-described conventional illuminator, both ends of the light guide are fixedly supported, causing the light guide to bend or bow along its length when the light guide lengthens due to thermal expansion by heat generated from the light source. These deformation or damages, e.g., bending or scratches, or the like, of the light guide causes variation in characteristics of light, and adversely affects the scanning performance and/or quality.

BRIEF DESCRIPTION OF THE DRAWINGS

Various aspects and advantages of the embodiments of the invention will become apparent and be more readily appreciated from the following description of the embodiments, taken in conjunction with the accompanying drawings, of which.

DETAILED DESCRIPTION OF SEVERAL EMBODIMENTS

Figure 1:
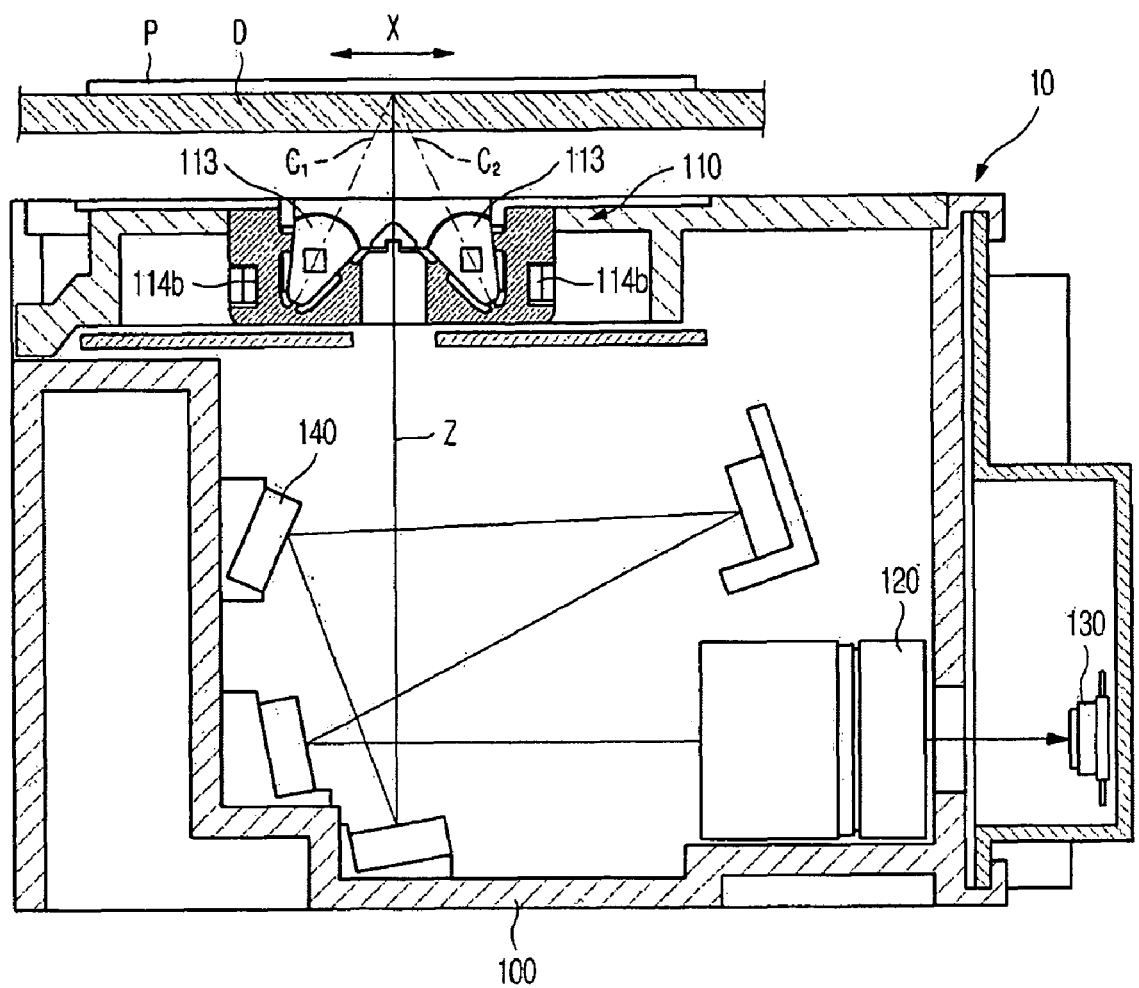
FIG. 1 is a sectional view illustrating optical arrangement of a scanner module in accordance with an embodiment of the present invention.

Reference will now be made in detail to embodiments of the present invention, examples of which are illustrated in the accompanying drawings, wherein like reference numerals refer to like elements throughout. While the embodiments are described with detailed construction and elements to assist in a comprehensive understanding of the various applications and advantages of the embodiments, it should be apparent however that the embodiments can be carried out without those specifically detailed particulars. Also, well-known functions or constructions will not be described in detail so as to avoid obscuring the description with unnecessary detail.

FIG. 1 is a sectional view illustrating optical arrangement of, a scanner module 10 according to an embodiment of the present invention. Referring to FIG. 1, the scanner module 10 may be devised to scan an image across a sub scanning direction X. The scanner module 10 includes an illuminator 110, which irradiates a light to a document platform D, a focusing lens 120, which focuses the light reflected from a scan object P, such as a document, or the like, disposed on the document platform D, and a sensor unit 130, which receives the light focused by the focusing lens 120 and senses an image based on the received light. The scanner module 10 further includes a scanner module body 100 having an inner space in which the focusing lens 120 and the sensor unit 130 may be housed. A seating recess 100a (See FIG. 2) may provided on the top portion of the scanner module body 100 for accommodating the illuminator 110.

Figure 2:
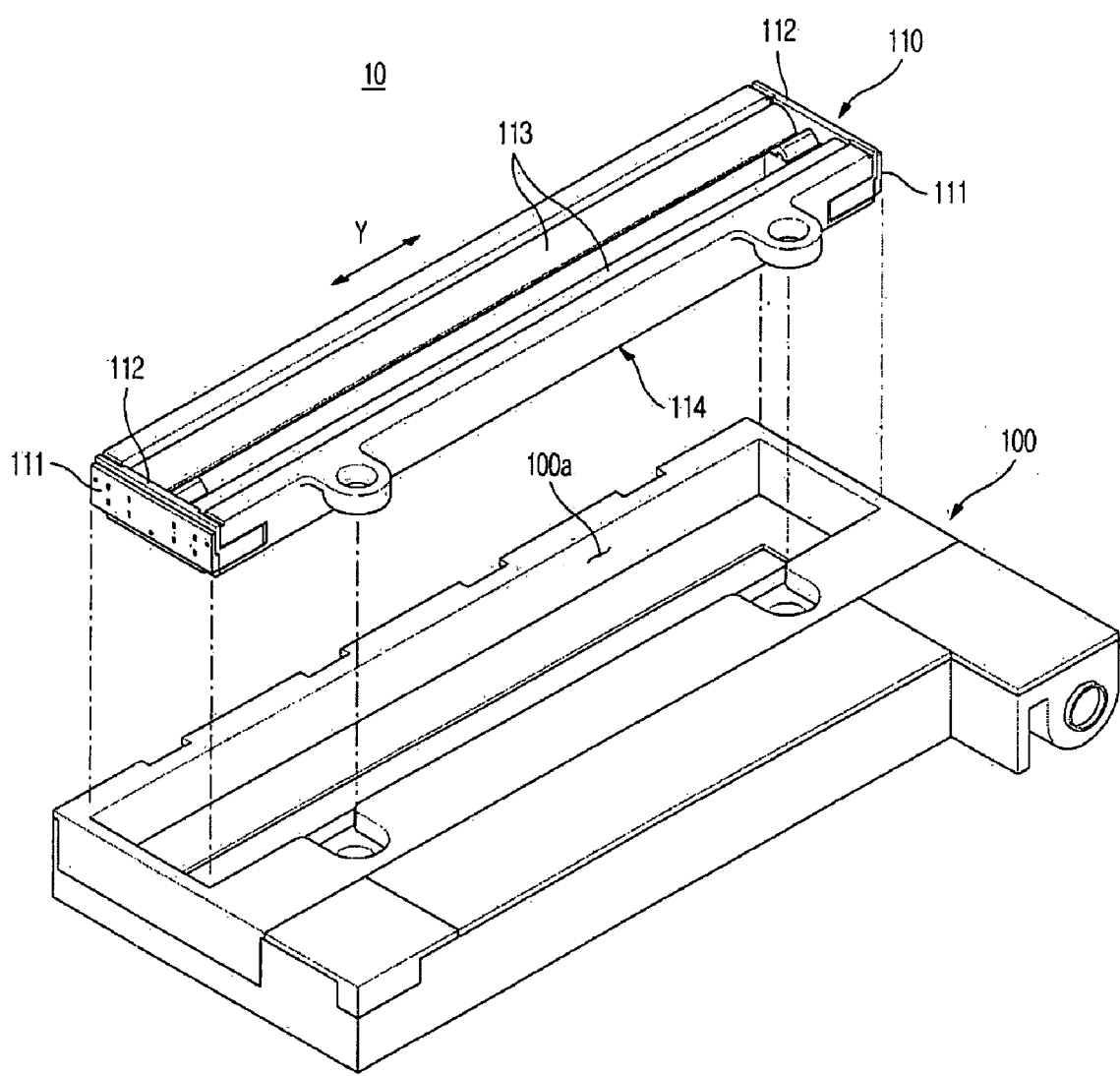
FIG. 2 is a perspective view of the scanner module in accordance with an embodiment of the present invention.
Figure 3:
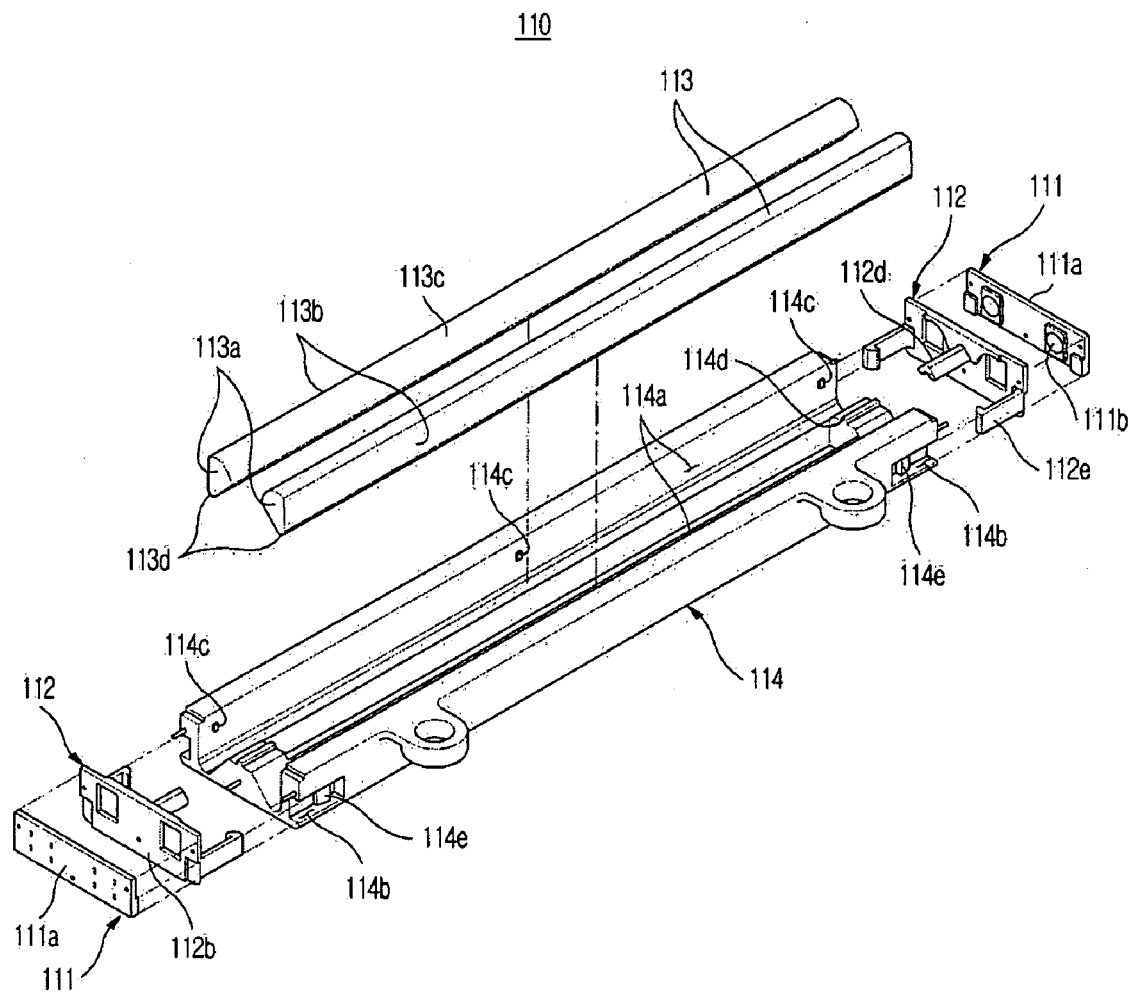
FIG. 3 is an exploded perspective view illustrating an illuminator in accordance with a first embodiment of the present invention.
Figure 4:
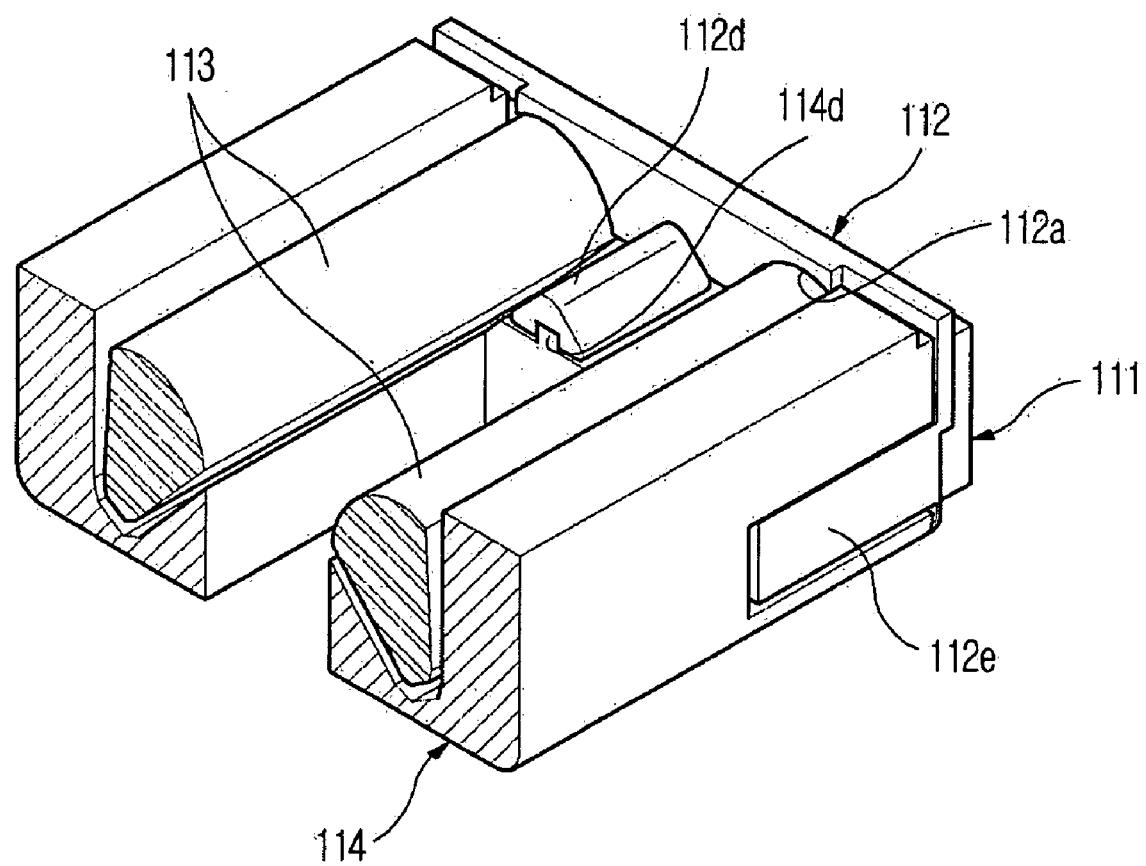
FIG. 4 is a perspective and partial sectional view of portions of the illuminator of FIG. 3.

The illuminator 110 serves to irradiate light to the scan object P. As shown in FIGS. 2 and 3, the illuminator 110 may include light source of sources 111 that produce the light, and light source holders 112 to which the light sources 111 are mounted. The illuminator 110 may further include light guides 113, the lengths of which extend along a main scanning direction Y (orthogonal to the sub scanning direction X), and which are arranged to face and oppose the document platform D. The illuminator 110 may further include a guide holder 114 having light guide mounting portions 114a for mounting of the light guides 113 and light source mounting portions 114b for mounting of the light source holders 112.

Referring again to FIG. 1, the focusing lens 120 is located between the document platform D and the sensor unit 130, and serves to focus the light reflected from the scan object P onto the sensor unit 130.

The sensor unit 130 receives the light focused thereon by the focusing lens 120, and serves to detect an image of the scan object P based on the received light. Depending on the particular scanning application, the sensor unit 130 may have a single-row configuration, or a multiple row configuration, for scanning of Red/Green/Blue color images or Red/Green/Blue/Black-and-White images. Specifically, the sensor unit 130 may include image sensors, e.g., charge coupled device (CCD) or complimentary metal oxide (CMOS) pixel elements, for respective colors, which are arranged in plural rows spaced apart from one another.

A plurality of reflecting mirrors 140 may further be provided between the scan object P and the focusing lens 120. The reflecting mirrors 140 serve to define a light path within the inner space of the scanner module body 100. To this end, the reflecting mirrors 140 reflect the light reflected from the scan object P, and change the light path to direct the light toward the focusing lens 120. Providing the plurality of reflecting mirrors 140 may advantageously achieve the required light focusing distance between the scan object P and the sensor unit 130, and may also result in a compact size of the scanner module body 100. In the present embodiment, the scanner module 10 is provided with four reflecting mirrors 140, but the present invention is not so limited, and any number of reflecting mirrors can be selected for a particular design.

Figure 8:
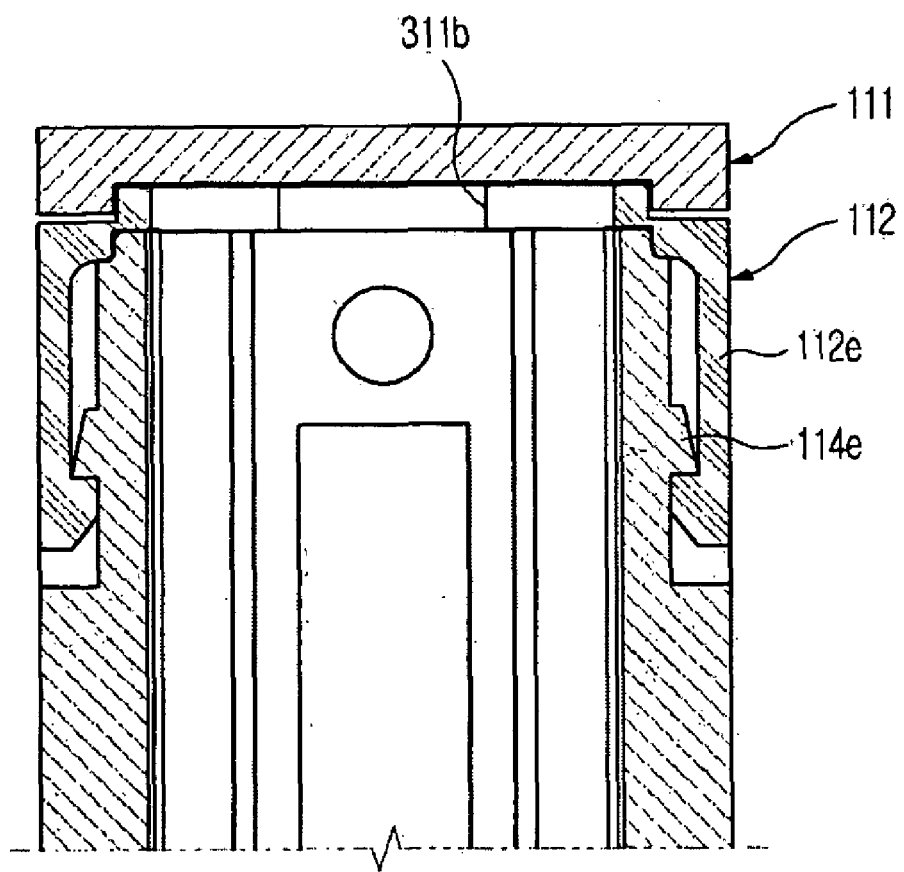
FIG. 8 is a partial sectional view illustrating coupling of a guide holder and light source holder shown in FIGS. 2-7.

FIGS. 2 to 5 are a perspective view, an exploded perspective view, a partial perspective view, and a sectional view, respectively, illustrating the illuminator employed according to the first embodiment of the present invention. FIG. 6 is a perspective view illustrating the light source holder according to an embodiment. FIG. 8 is a partial sectional view illustrating assembly of the guide holder and the light source holder shown in FIGS. 2-6.

Referring to the drawings, the illuminator 110 is employed in the scanner module 10, to irradiate light to the scan object P, which is disposed on the document platform D, in the main scanning direction Y that is substantially orthogonal to the sub scanning direction X of the scanner module 10.

The illuminator 110 includes light sources 111 producing light, the light source holders 112 to which the light sources 111 are mounted, the light guides 113 longitudinally arranged along the main scanning direction Y to face the document platform D, and the guide holder 114, in which the light guides 113 are mounted.

Each of the light sources 111 may include a substrate 111a mounted to the light source holder 112, and light emitting diodes 111b formed on the substrate 111a to irradiate light upon receiving power through the substrate 111a. In an embodiment, the light emitting diodes 111b may be white light emitting diodes.

The light guides 113 change a direction of the light irradiated from the light sources 111, so as to direct the light to an image reading region on the document platform D. In one embodiment, to enhance the luminous intensity of light to be directed to the image reading region, the plurality of light guides 113 may be provided.

The light guides 113 are made of a transparent material such as glass, plastic, or the like, and have an elongated shape, the length of which extending along the main scanning direction Y. Each of the light guides 113 includes at least one incidence face 113a, guide faces 113b and an emission face 113c.

The incidence face 113a receives the light from the corresponding light emitting diode 111b. The incidence face 113a is formed on at least one of both longitudinal ends of the respective light guides 113. Here, the light source 111 is mounted to the light source holder 112 such that the light source 111 faces the incidence face 113a of the light guide 113.

The emission face 113c opposes the document platform D, through which the light diffused and reflected by the guide faces 113b is emitted. In one embodiment, the emission face 113c may form a collimating lens.

The guide faces 113b are formed at both longitudinal sides of the light guide 113. If light is introduced through the incidence face 113a via total internal reflection, the guide faces 113b guide the direction of the light, allowing the light to be emitted throughout the emission face 113c.

The reflecting face 113d reflects the light, introduced thereto through the incidence face 113a, toward the emission face 113c. The reflecting face 113d is formed at the light guide 113 at an opposite side of the emission face 113c. For reflection of light, the reflecting face 113d has a light reflecting pattern defined by convex and concave portions.

In the present embodiment, a pair of the light guides 113 is arranged to be adjacent to each other along the sub scanning direction X. The pair of light guides 113 may be tilted towards each other to direct the light to the image reading region without interfering with the light reflected from the scan object P. That is, as shown in FIG. 1, center axes C1 and C2 of light having passed through the two respective light guides 113 are tilted with respect to the center optical axis Z.

In the embodiment shown, a pair of the light sources 111 is provided for each of the light guides 113, a pair of the light emitting diodes 111b being installed on the substrate 111a of each light source 111. With this configuration, the two light emitting diodes 111b of each of the pair of light sources 111 can irradiate the light on each incidence face 113a formed at both ends of each of the pair of light guides 113.

In addition, a light source holders 112 is provided on each longitudinal ends of the guide holder 114 such that a light source 111 is provided on each of the ends of each light guide 113. When light is irradiated from the light source 111 provided at one end of a light guide 113, and is introduced to the light guides 113 through the incidence faces 113a facing the light source 111, in order to prevent the light from leaking from the light guides 113 through the incidence faces 113a at the other end, the pair of light source holders 112 are arranged to cover both incidence faces 113a of the respective light guides 113, the light source holders 112 being adapted to reflect the light. That is, the pair of light source holders 112 covers the pair of incidence faces 113a of each light guide 113, thereby preventing the light, introduced into the light guide 113 through the incidence faces 113a of on one end, from leaking from the light guide 113 through the incidence face 113a on the other end of the light guide 113.

In an embodiment, preferably, the light source holders 112 are made of a white material to reflect and diffuse light, the material having a light reflectivity of 70% or greater. With adoption of the light source holders 112 to prevent the light, irradiated from the light sources 111 into the light guides 113, from leaking from the light guides 113 through the incidence faces 113a, the illuminator 110 can achieve greater luminous intensity of light using the same light sources 111.

While the above embodiment is described to include a pair of light sources 111 at each end of the light guides 113 via the pair of light source holders 112, but this configuration is given only as an example. Alternatively, a single light source 111 may be mounted to only one end of each of the light guides 113 via a single light source holder 112.

According to an embodiment, the guide holder 114 may serve to guide mounting positions of the light guides 113 and the light sources 111. To this end, the guide holder 114 is formed with at least one light source mounting portion 114b to which the light source holder 112 may be mounted to provide a light source 111 on at least one end of each of the light guides 113, and the light guide mounting portions 114a in which the light guides 113 are to be mounted.

Each light guide mounting portion 114a may be recessed into the guide holder 114 extending longitudinally along the main scanning direction Y, and has a shape corresponding to that of the light guide 113. For example, in the embodiment shown, the light guide mounting portion 114a may have a trapezoidal cross-sectional shape having an inwardly tapered cross section. In the embodiment, the pair of the light guide mounting portions 114a are arranged adjacent each other along the sub scanning direction X, and extend parallel to each other along the main scanning direction Y such that the pair of light guides 113 can be mounted parallel to each other.

Preferably, the light guide 113 is inserted into the light guide mounting portion 114a by being moved in a direction orthogonal to the longitudinal direction of the light guide 113. If the light guide 113 is inserted into the longitudinal direction of the light guide mounting portion 114a, scratches may occur on an outer surface of the light guide 113. Inserting the light guide 113 in a direction orthogonal to the longitudinal direction thereof may reduce the possibility of scratching the light guides 113. For example, in the embodiment shown, the light guide mounting portion 114a has, e.g., a trapezoidal cross section with its height significantly smaller than its length. Therefore, when a light guide 113 is inserted into the light guide mounting portion 114a along the height of the light guide mounting portion 114a, i.e. orthogonal to the longitudinal direction of the light guide 113, the contact distance between the light guide 113 and the light guide mounting portion 114a may be substantially shorter that when the light guide 113 is received into the recess in lengthwise direction, and consequently, damage to the light guide 113 can be minimized.

The guide holder 114 may be made of a flexible material, which is elastically deformable in response to a pressing force. For example, before the light guide 113 is inserted into the light guide mounting portion 114a, the light guide mounting portion 114a, as represented by the dotted line in FIG. 5, may have a narrower initial inner space than the space required for mounting of the light guide 113.

Figure 5:
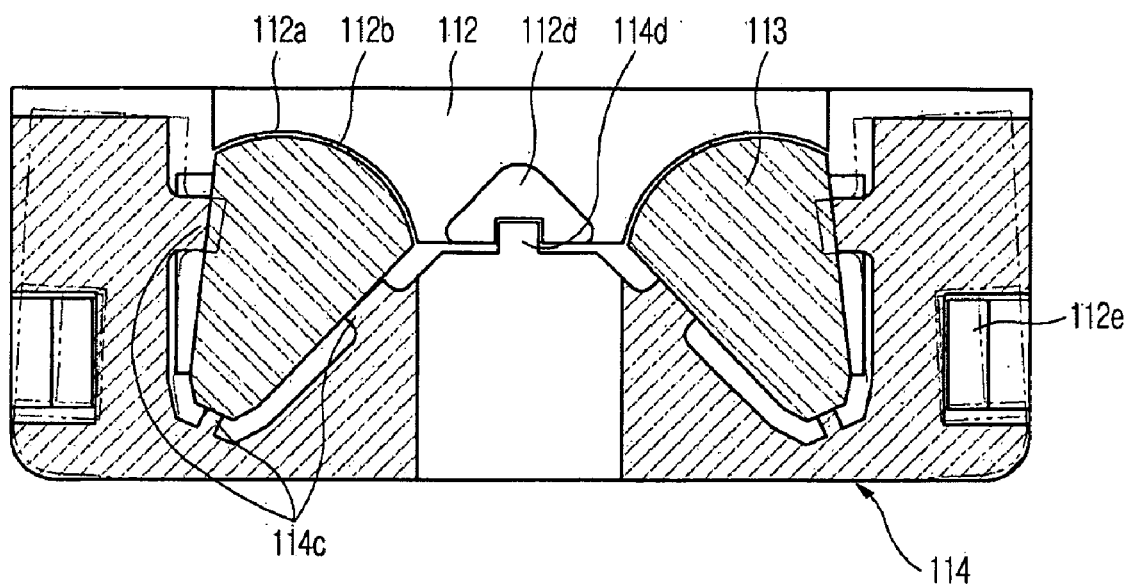
FIG. 5 is a sectional view of the illuminator of FIG. 3.
Figure 6:
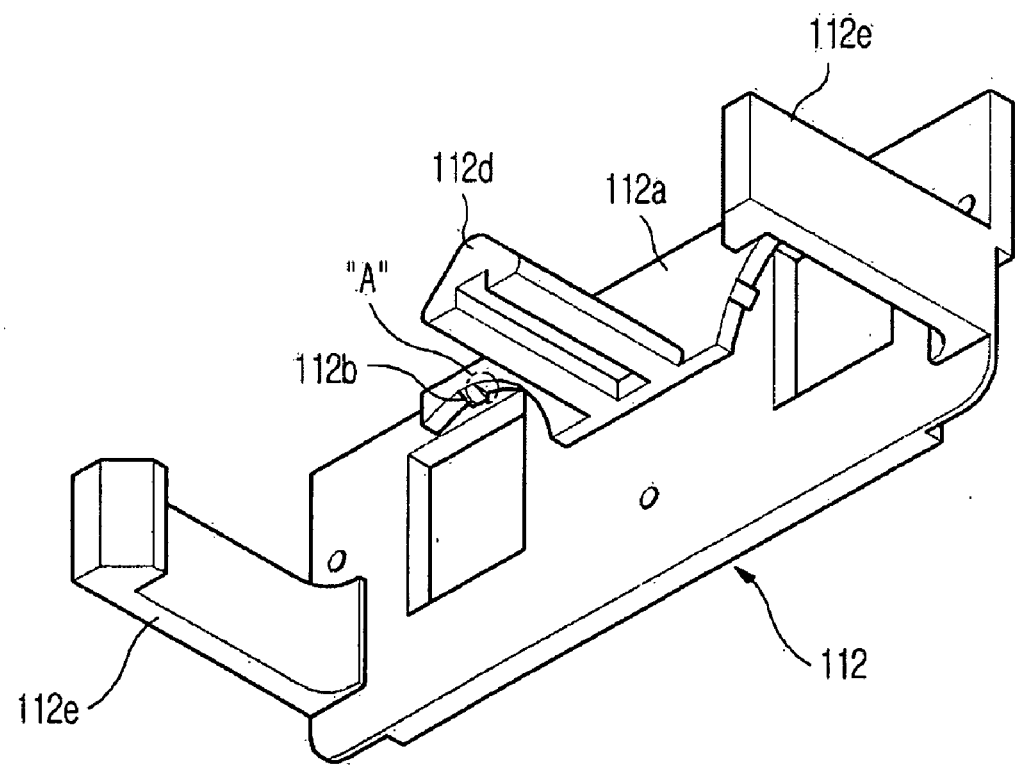
FIG. 6 is a perspective view illustrating an embodiment of a light source holder of the illuminator of FIG. 3.

When the light guide 113 is received into the light guide mounting portion 114a, as shown in FIG. 5, the light guide mounting portion 114a expands by the insertion of the light guide 113, preventing unwanted movement of the light guide 113 after installation.

According to an embodiment, the illuminator 110 may further include spacers 114c provided on the inner surface of the light guide mounting portion 114a to support the light guide 113.

Once the light guide 113 is inserted into the light guide mounting portion 114a that includes the spacers 114c, the light guide 113 can be supported by the spacers 114c while allowing gaps between the light guide 113 and the inner surface of the light guide mounting portion 114a. Providing the spacers 114c may further alleviate the problem of incompletely supporting the light guide 113 due to spatial deformation of the light guide mounting portion 114a resulting during manufacture of the guide holder 114. This consequently reduce bending of the light guide 113, and helps to maintain straightness of the light guide 113.

A plurality of spacers 114c may be spaced apart from one another along the longitudinal direction of the light guide 113. For example, in the present embodiment, the spacers 114c may be provided at the center and at opposite ends of the light guide mounting portion 114a along its length. As shown in FIG. 5, the spacers 114c may be arranged on the side wall surfaces and bottom surface of the light guide mounting portion 114a, so as to support the light guide 113 in three directions.

When a pair of the spacers 114c are arranged on the side wall surfaces of the light guide mounting portion 114a, the distance between the spacers 114c on opposite wall surfaces may be made smaller than the width of the light guide 113 to be located between the spacers 114c. With this configuration, as the light guide 113 is inserted into the light guide mounting portion 114a, the guide holder 114 is elastically deformed to provide a required installation space for the light guide 113, and the light guide 113 can come into pressing contact with the respective spacers 114c. In one embodiment, the spacers 114c may be formed integrally with the guide holder 114, which may improve assembly efficiency, and may reduce manufacturing costs.

The light source holder 112 may include a fixing portion 112a to keep the light guide 113 in place. The fixing portion 112a protrudes to have an inner contour corresponding to the contour of the emission face 113c of the light guide 113, and can be made to come into direct or indirect contact with the emission face 113c of the light guide 113 so as to prevent vertical movement of the light guide 113.

For example, as shown in FIG. 6, the light source holder 112 may further include a fixing rib 112b formed on the inner edge surface of the fixing portion 112a. Once the light guide 113 is mounted in the light guide mounting portion 114a, the fixing rib 112b may come into partial contact with the light guide 113, and can keep the light guide 113 in position.

Figure 7:
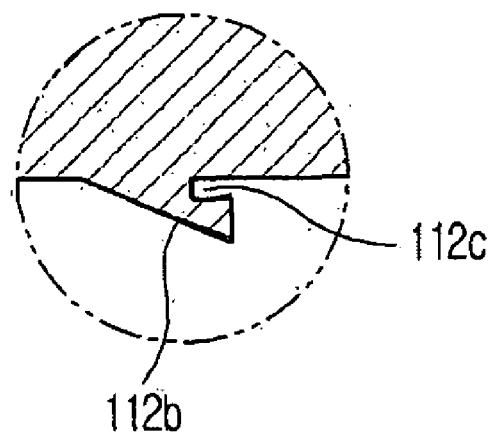
FIG. 7 is a sectional view of the portion "A" of FIG. 6.

During the coupling of the light source holder 112 to the guide holder 114, the fixing rib 112b and the light guide 113 move relatively each other while being in contact, possibly causing the light guide 113 to be scratched. Thus, in one embodiment, the fixing rib 112b may be tapered as shown in FIG. 7. The tapered fixing rib 112b may reduce possible damages to the light guide 113 during the installation of the light source holder 112 in the guide holder 114.

To address the possible thermal expansion of the light guide 113, according to an embodiment shown in FIG. 7, the fixing rib 112b may be provided with a neck portion 112c, which forms a recessed portion between the fixing portion 112a and the fixing rib 112b.

If a greater pressure is applied to an outer surface of the fixing rib 112b as the light guide 113 is thermally deformed, the neck portion 112c allows elastic movement of the fixing rib 112b. As a result, the light guide 113 can be stably supported at a fixed position without damaging the fixing rib 112b. The structure of the neck portion 112c is described only by way of an example for addressing thermal deformation of the light guide 113, and does not limited the present embodiments to the particular structure. Various other shapes or structures can also be employed to account for the thermal expansion of the light guide 113. For example, when the light source holder 112, the fixing portion 112a and/or the fixing rib 112b itself is made of an elastically deformable flexible material, the light source holder 112 can also stably support the light guide 113.

In addition, the illuminator 110 may further include positioning guides 112d and 114d to set the mounting position of the light source holder 112 relative to the guide holder 114. The positioning guides 112d and 114d are shaped to match each other, and are arranged to be opposing positions on the guide holder 114 and the light source holder 112, respectively. When coupling the light source holder 112 to the guide holder 114, the coupling position can be set on the basis of the positioning guides 112d and 114d, making rapid and accurate coupling between the guide holder 114 and the light source holder 112 possible.

Preferably, the light source holder 112 may be capable of being snap-fitted to the mounting portion 114b of the guide holder 114. Snap-fitting may not require any screws or bonding adhesives and, therefore, advantageously enables easy coupling.

The light source holder 112, as shown in FIG. 3, can be coupled to the mounting portion 114b in a direction substantially parallel the longitudinal direction of the light guide 113. To that end, to mount the light source holder 112 in the mounting portion 114b, hook members 112e and holding protrusions 114e may be provided.

The hook members 112e, as shown in FIGS. 6 and 8, may extend from a surface of the light source holder 112 facing the guide holder 114, and the holding protrusions 114e may be provided at positions of the guide holder 114 corresponding to the mounted positions of the respective hook members 112e. When the hook members 112e engage the holding protrusions 114e, the light source holder 112 may be coupled to the guide holder 114.

While in the above embodiment, the light guide holder 112 is described to have formed therewith the hook members 112e, and the guide holder 114 as including the holding protrusions 114e, but the present invention is not so limited. For example, the respective locations of the hook members and holding protrusions may be reversed.

Figure 10:
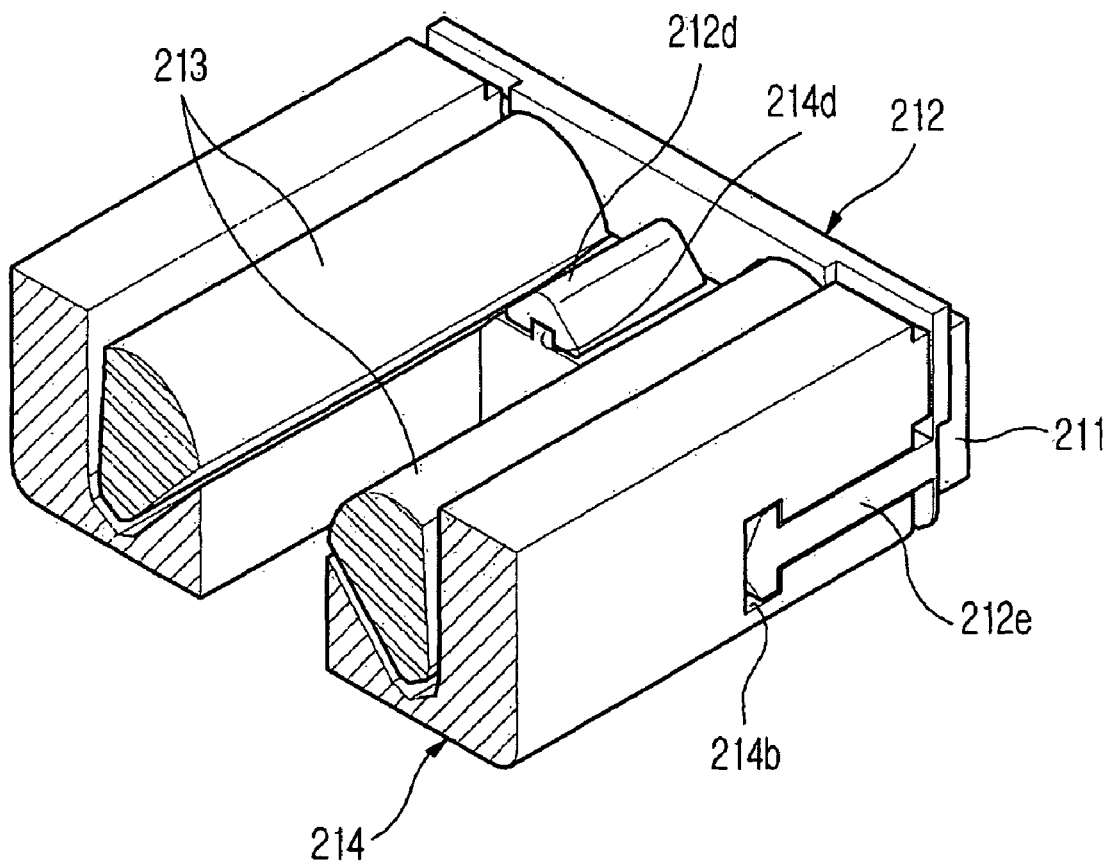
FIG. 10 is a perspective and a partial sectional view of an illuminator in accordance with a second embodiment of the present invention.

In addition, the hook members 112e are not limited to the above-described configuration. For example, according to a second embodiment of illuminator shown in FIG. 10, each hook member 212e of the light source holder 212 may be formed, at the distal tip end thereof, with a relatively large width portion while the light source mounting portion 214b of a guide holder 214 may be provided with a recess having a shape corresponding to that of the hook member 212e. Accordingly, the light source holder 212 can be coupled to the guide holder 214 as the hook member 212e is snap-fitted in the mounting portion 214b as shown in FIG. 10.

Figure 11:
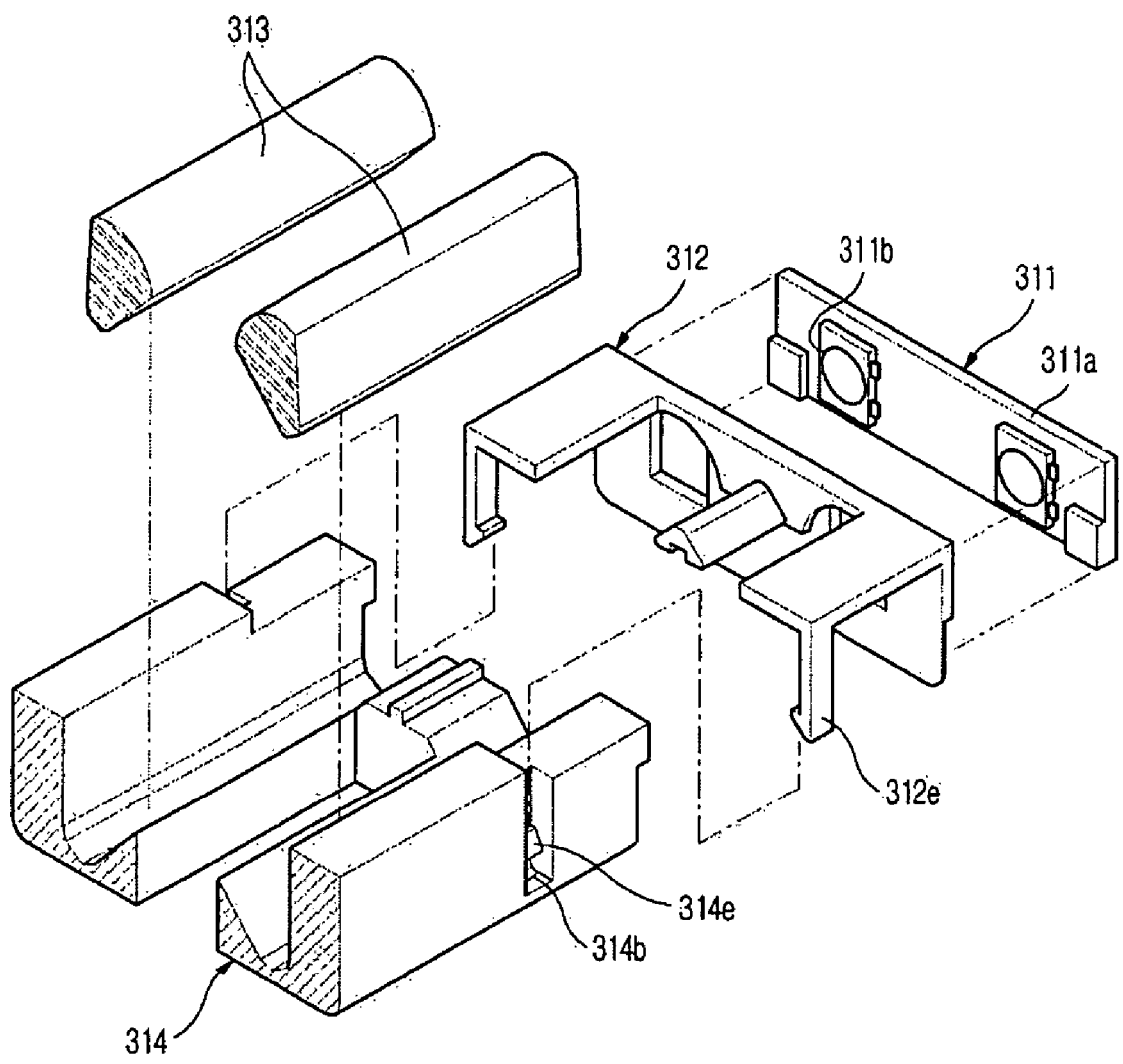
FIG. 11 is an exploded and a partial sectional view of relevant portions of an illuminator in accordance with a third embodiment of the present invention.

Referring to FIG. 11 illustrating an illuminator according to a third embodiment, a light source holder 312 may be fitted into a mounting portion 314b of a guide holder 314 in a direction orthogonal to the longitudinal direction of a light guide 313. For example, an illuminator of this embodiment may further include hook members 312e and holding protrusions 314e, to stably fit the light source holder 312 into the mounting portion 314b.

The hook members 312e, as shown in FIG. 11, may protrude downward from side edges of the light source holder 312, and the holding protrusions 314e may be provided at positions of the guide holder 314 corresponding to the mounted position of the respective hook members 312e. Accordingly, as the hook members 312e engage the holding protrusions 314e, the light source holder 312 can be coupled to the guide holder 314.

When the light source holder 312 is coupled to the guide holder 314 in the above-described direction, as there is substantially no risk of the contact position between the fixing rib of the light source holder 312 and the light guide 313 being changed during assembly, the generation of scratches can thus be substantially avoided.

The above-described configuration of the illuminator, along with one or more features of previously described embodiments, advantageously allows precise positioning an/or quick coupling of the light guide 313 and the light source 311. In addition, the light guide 313 can be firmly supported to maintain straightness thereof.

Figure 12:
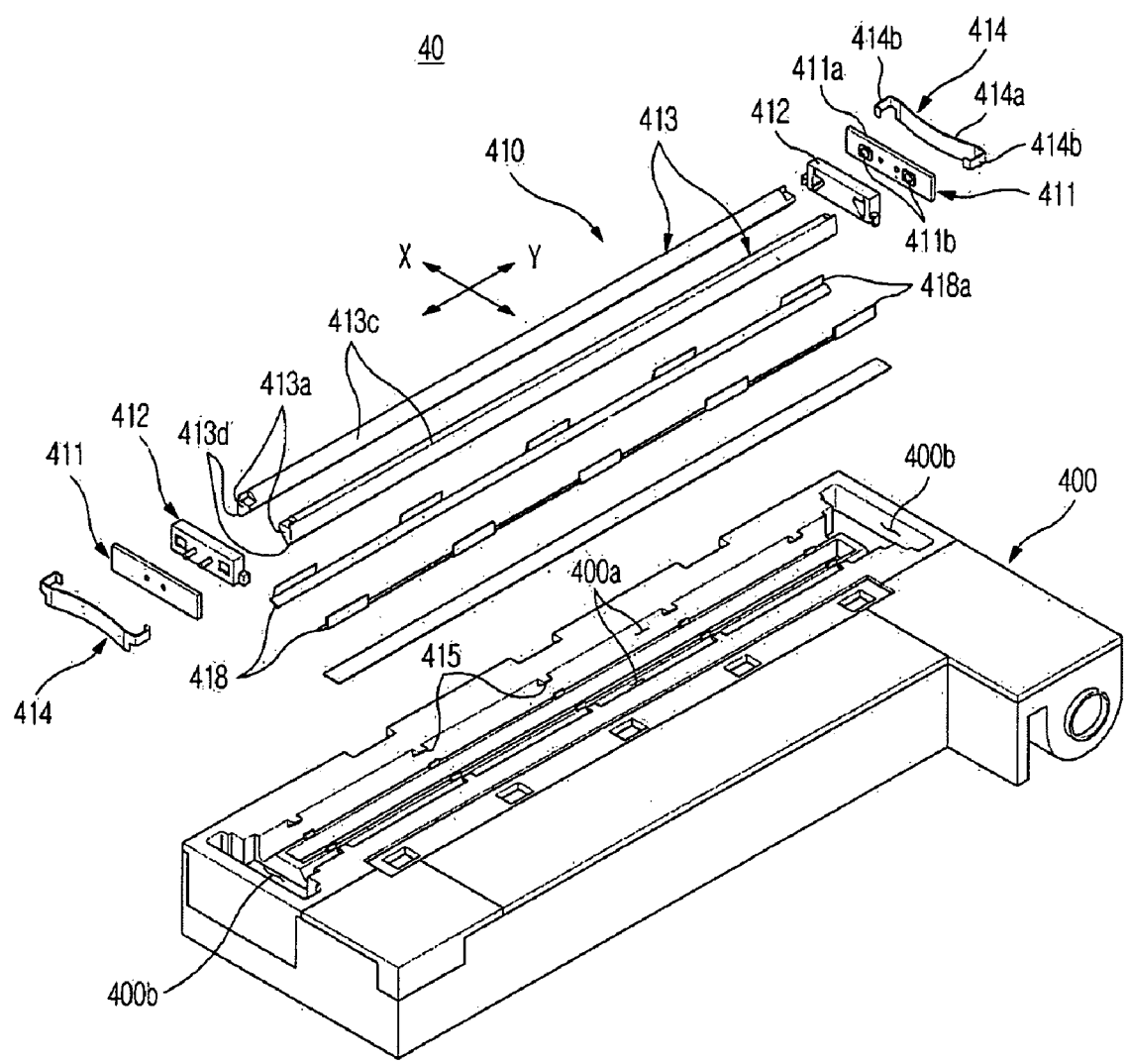
FIG. 12 is an exploded perspective view illustrating a scanner module including an illuminator in accordance with a fourth embodiment of the present invention.

Although the illuminator 110 in accordance with the first embodiment of the present invention includes the guide holder 114 to be mounted into the scanner module body 100 after the light guides 113, light sources 111 and light holders 112 are mounted to the guide holder 114, the present invention is not so limited. For example, referring to FIG. 12 illustrating an illuminator according to a fourth embodiment, instead of using the guide holder 114, an illuminator 410 of a scanner module 40 includes light guides 413, light sources 411 and light source holders 412, and a scanner module body 400, on which the light guide mounting portions 400a for mounting of the light guides 413 and the light source mounting portions 400b for mounting of both the light sources 411 and the light source holders 412 are provided. With this configuration, the light guides 413, light sources 411 and light source holders 412 can be directly mounted into the scanner module body 400.

The light guide mounting portions 400a extend along the main scanning direction Y, i.e. in the longitudinal direction of the light guides 413. The light source mounting portions 400b are formed, at both ends of the light guide mounting portions 400a, to have a larger width than the width of the light guide mounting portions 400a. In the present embodiment, a pair of the light guides 413 are mounted in the scanner module body 400 such that they are parallel to each other in the sub scanning direction X, and for mounting of the pair of light guides 413, a pair of the light guide mounting portions 400a are provided parallel to each other in the sub scanning direction X.

In this embodiment, a light guide 413 is mounted in the light guide mounting portion 400a in such a manner that at least one of the longitudinal ends thereof is elastically supported by an elastic member 414. This serves to minimize deformation of the light guide 413 caused when the light guide 413 increases in length due to thermal expansion by heat generated from the light sources 411. If the light guide 413 increases in length due to thermal expansion, the light guide 413 may become convexly deformed, or bowed, at the center of an emission face 413c, causing variation in characteristics of light emitted through the light guide 413 and deterioration in image scanning performance.

Figure 13:
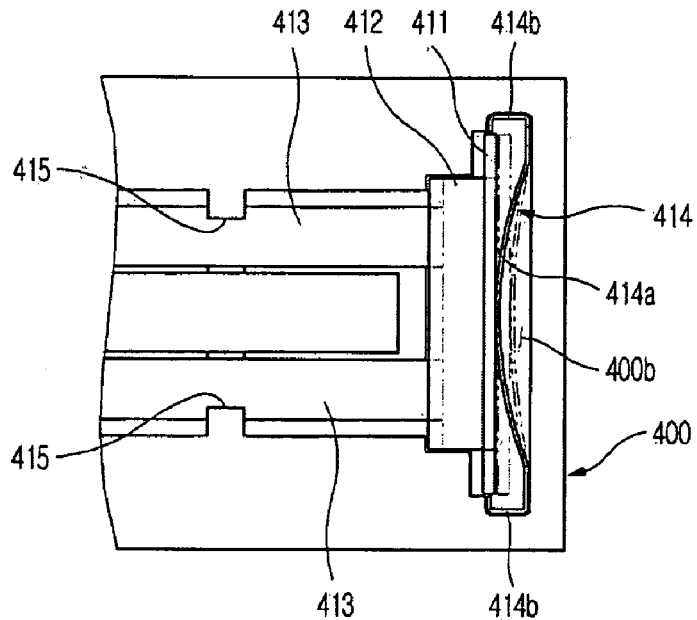
FIG. 13 is a plan view illustrating coupling of a light source and light source holder provided in the scanner module shown in FIG. 12.

By elastically supporting at least one of end of the light guide 413 using the elastic member 414, even if the light guide 413 increases in length due to thermal expansion, the metal elastic member 414 can partially compensate for the increase in the length of the light guide 413 via elastic deformation thereof as shown in FIG. 13. This substantially reduces the emission face 413c of the light guide 413 from being bent or bowed.

Figure 14:
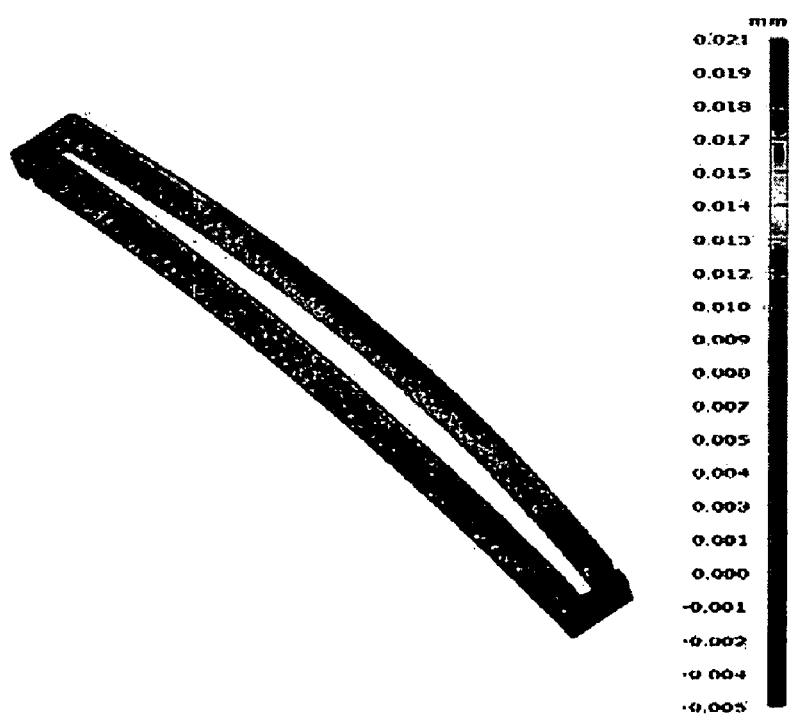
FIG. 14 is a view illustrating numerical analysis results of deformation of a light guide in response to thermal expansion of the light guide when no elastic member is provided.
Figure 15:
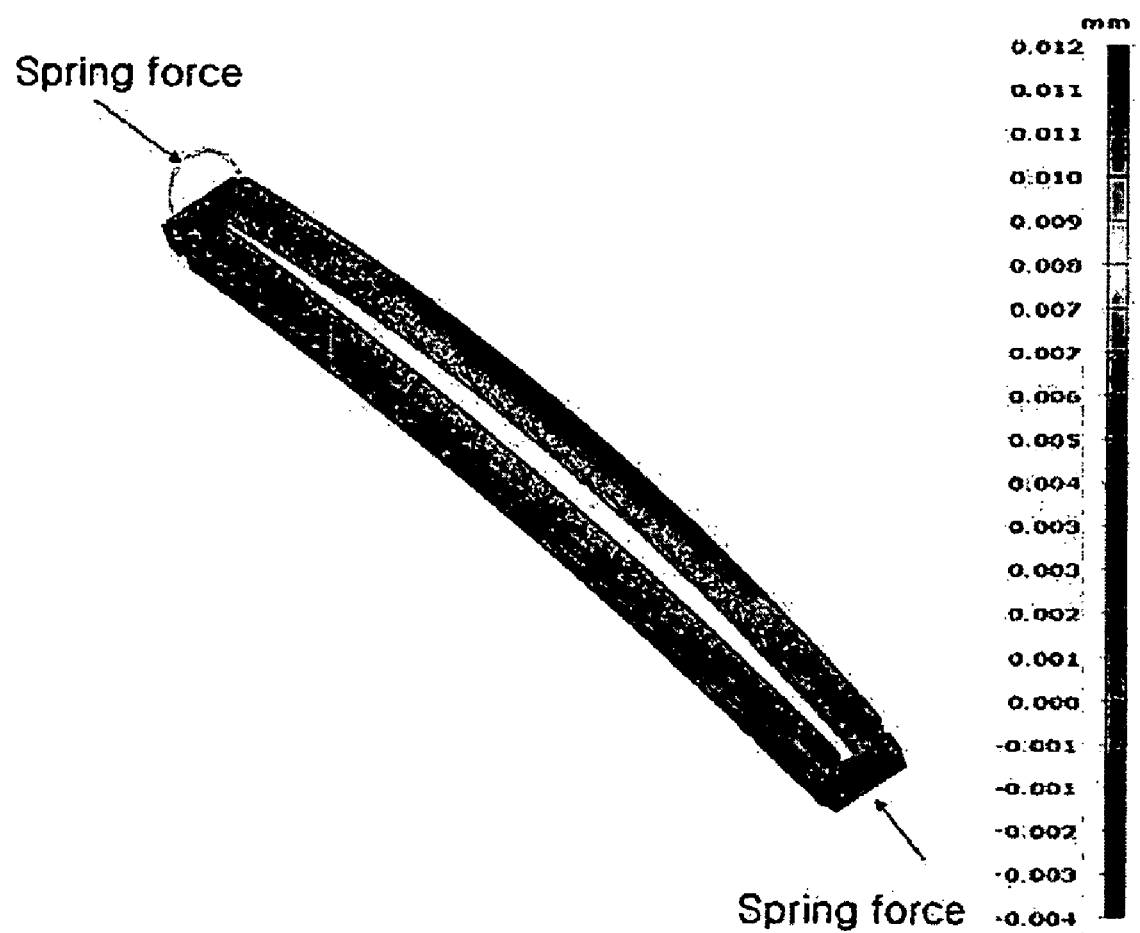
FIG. 15 is a view illustrating numerical analysis results of deformation of a light guide in response to thermal expansion of the light guide when elastic members are provided.

FIG. 14 is a view illustrating results of numerical analysis of deformation of the light guide 413 when both the ends of the light guide 413 are fixedly supported, and FIG. 15 is a view illustrating results of numerical analysis of deformation of the light guide 413 when both ends of the light guide 413 are elastically supported by the elastic members 414.

As can be seen from FIGS. 14 and 15, the light guide 413 has a deformation amount of about 0.021 mm when both the ends of the light guide 413 are fixedly supported, whereas the light guide 413 has a deformation amount of 0.012 mm when both the ends of the light guide 413 are elastically supported by the elastic members 414. Accordingly, in this example, it can be appreciated that supporting both the ends of the light guide 413 via the elastic members 414 may reduce the deformation amount of the light guide 413 to about half.

When the length of the light guide 413 varies according to heat generated from the light sources 411, an incidence face 413a of the light guide 413 may become spaced further apart from a corresponding light emitting diode 411b of the light source 411. In this case, light loss may occur as the light irradiated from the light emitting diode 411b passes through air between the light emitting diode 411b and the incidence face 413a. Therefore, to minimize the light loss, it is preferred that the incidence face 413a provided at either end of the light guide 413 come into close contact with the corresponding light emitting diode 411b of the light source 411.

In an embodiment, to maintain the proper distance between the incidence surface 413a and the light emitting diode 411b, the light source 411 is mounted to either end of the light guide 413 via the light source holder 412, and the elastic member 414 is provided between the light source 411 and a wall surface of the light source mounting portion 400b to elastically support the light guide 413 indirectly by way of the light source 411. When supporting the light guide 413 in this manner using the elastic member 414 with the light source 411 being interposed between the incidence surface 413a and the elastic member 414, the elastic member 414 can reduce the possible bowing of the light guide 413, and may also allow the light emitting diode 411b of the light source 411 to maintain a sufficiently close proximity to the corresponding incidence face 413a of the light guide 413, resulting in reduction of light loss.

Referring again to FIG. 12, the elastic member 414 according to an embodiment may be a leaf spring. The elastic member 414 in the form of a leaf spring consists of a center elastic portion 414a, which is convexly raised to exhibit an elastic force so as to elastically support the light source holder 112, and supporting portions 414b which are defined at both sides of the elastic portion 414a to allow the elastic member 414 to be supported in the light source mounting portion 400b. The elastic member 414 may be made of a material exhibiting high thermal conductivity, such as metallic material, to thus serve, in addition to providing the elastic support, as a radiating member to radiate heat generated from the light source 411 away from the light source 411.

Figure 16:
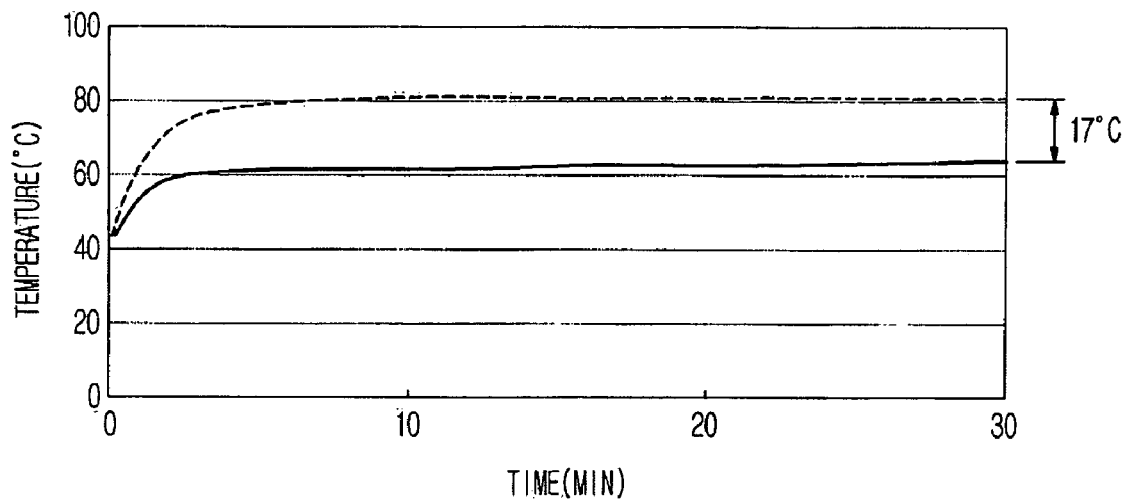
FIG. 16 is a graph comparing temperatures of a light source in both cases where the light source is elastically supported by metal elastic members and where no elastic member is provided.

FIG. 16 is a graph showing the measured temperatures of the light source 411 in both cases of when the metal elastic members 414 is used and when it was not. In the graph of FIG. 16, the dotted curve represents the temperature variation when the elastic member 414 was not used, and the solid curve represents the temperature variation when the metal elastic member 414 is used. As can be seen from the graph, in this example, the use of the metal elastic member 414 can lower the temperature of the light source 411 by approximately 17° C.

According to an embodiment, to more effectively restrict the emission face 413c of the light guide 413 from being deformed by heat generated from the light sources 411, supporting protrusions 415 protrude from an entrance of the light guide mounting portion 400a, so as to support a part of the emission face 413c of the light guide 413.

Figure 17:
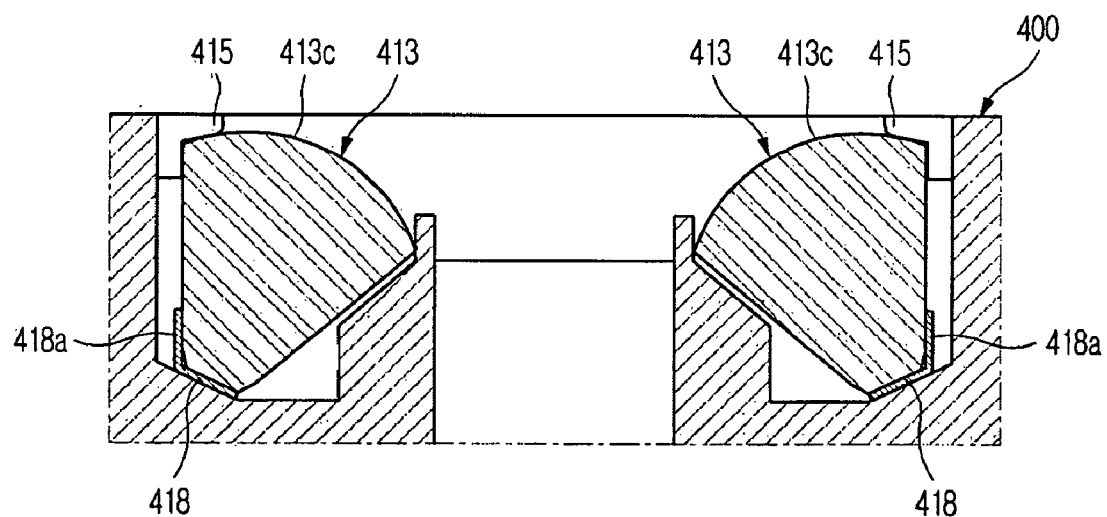
FIG. 17 is a sectional view illustrating an embodiment of the mounting of the light guide mounted in an illuminator.

Specifically, the supporting protrusions 415 are integrally formed with the scanner module body 400. The plurality of supporting protrusions 415 protrude in the sub scanning direction X and are spaced apart from one another in the main scanning direction Y. As shown in FIG. 17, when a part of the emission face 413c of the light guide 413 is supported by the supporting protrusions 415, the supporting protrusions 415 can restrict deformation of the light guide 413 even if the light guide 413 thermally expands due to heat generated from the light sources 411. In the present embodiment, the pair of light guide mounting portions 400a are arranged parallel to each other in the sub scanning direction X, and each supporting protrusion 415 protrudes in the sub scanning direction X from one side of the light guide mounting portion 400a so as to support a part of the emission face 413c of the light guide 413.

Figure 18:
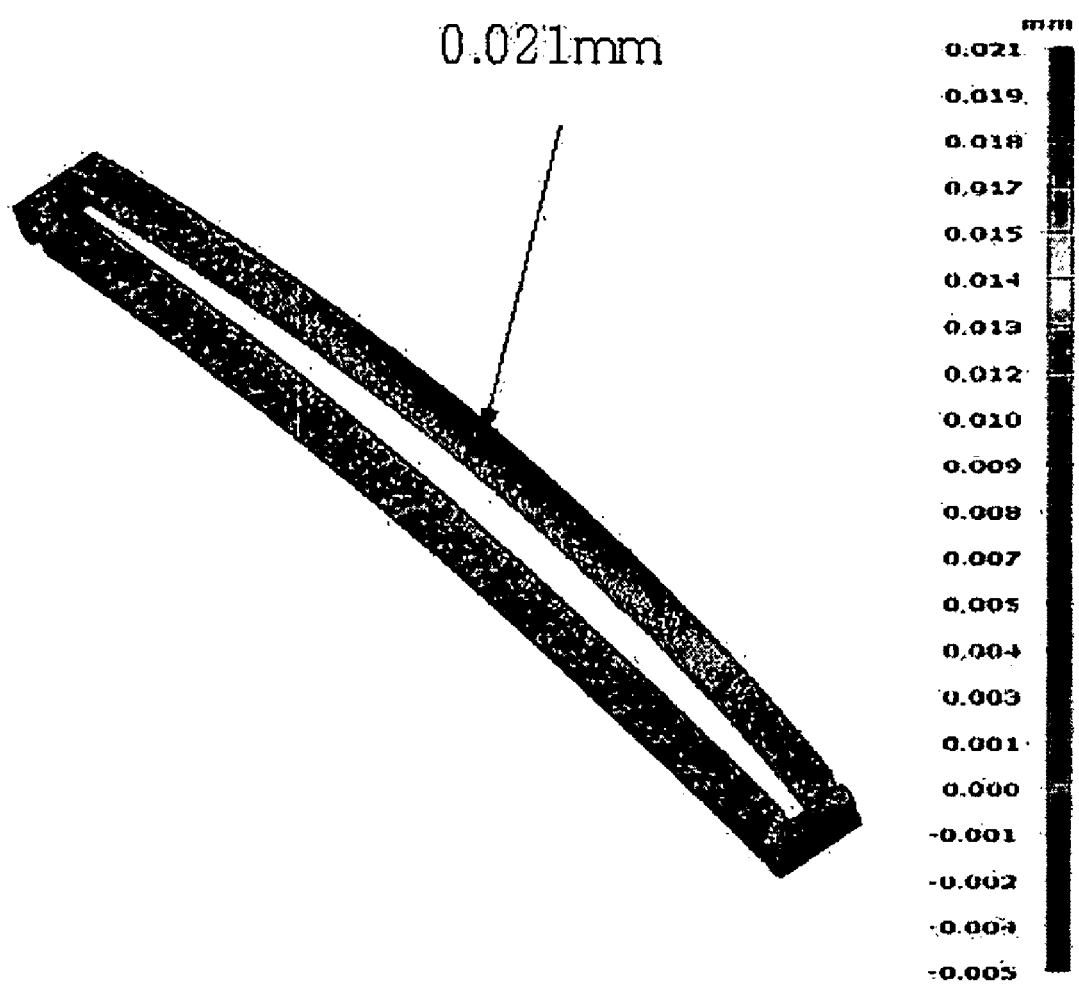
FIG. 18 is a view illustrating numerical analysis results of deformation of a light guide in response to thermal expansion of the light guide when no supporting protrusion is provided.
Figure 19:
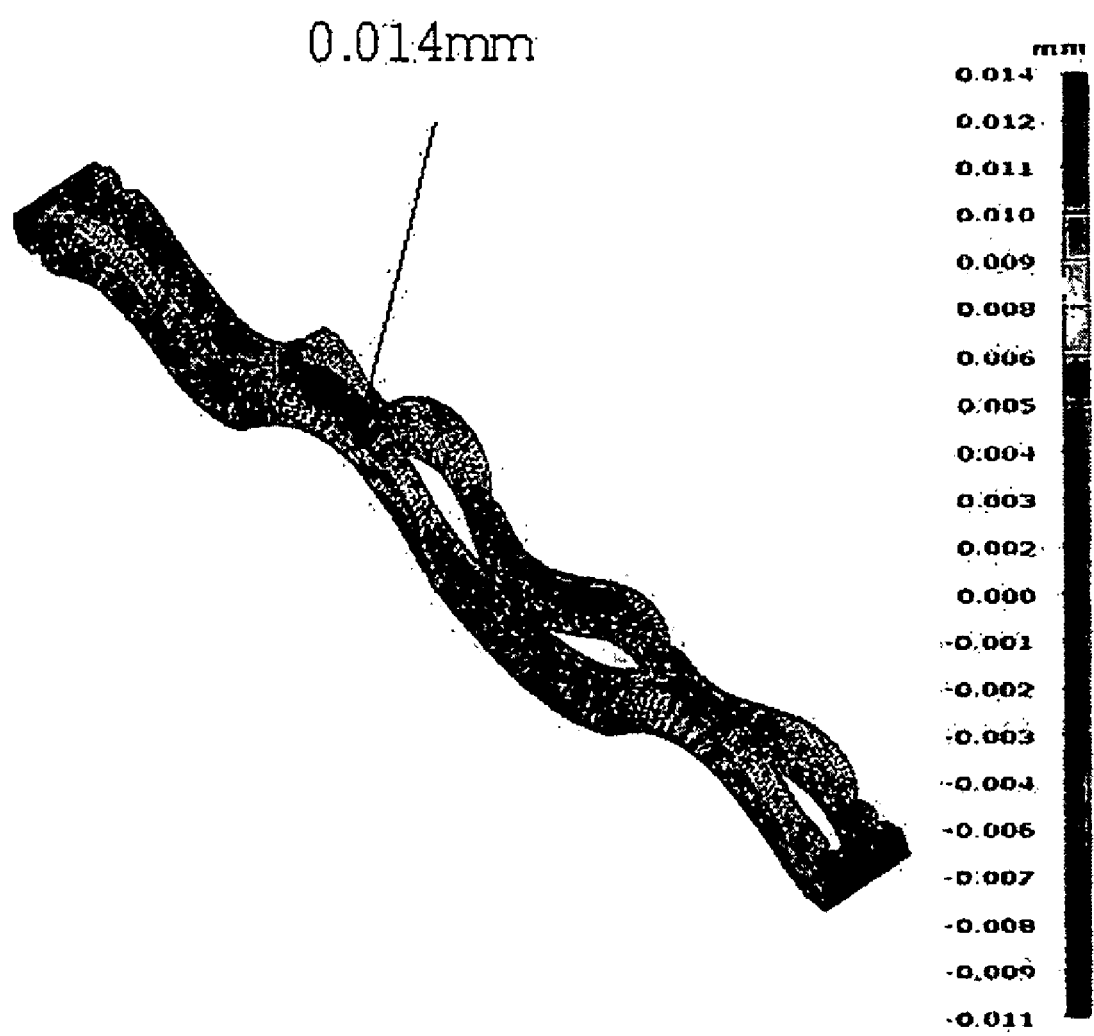
FIG. 19 is a view illustrating numerical analysis results of deformation of a light guide in response to thermal expansion of the light guide when supporting protrusions are provided.

FIG. 18 is a view illustrating numerical analysis results of deformation of the light guide 413 when not using the supporting protrusion 415, and FIG. 19 is a view illustrating numerical analysis results of deformation of the light guide 413 when using three supporting protrusions 415.

As can be seen from FIGS. 18 and 19, in this example, the light guide 413 has a deformation amount of about 0.021 mm when the supporting protrusion 415 was not used, whereas the light guide 413 has a deformation amount of about 0.014 mm when the emission face 413c of the light guide 413 is supported by the supporting protrusions 415. Accordingly, it can be appreciated that use of the supporting protrusions 415 can substantially reduce the deformation amount of the light guide 413.

As described above, when the light guide 413 is elastically supported by the elastic members 414 and/or when the emission face 413c of the light guide 413 is supported by the supporting protrusions 415, deformation of the light guide 413 can be reduced. Accordingly, to minimize deformation of the light guide 413, as described with relation to the present embodiment, it is preferred that both the ends of the light guide 413 be elastically supported by the elastic members 414 and that the emission face 413c of the light guide 413 be supported by the plurality of supporting protrusions 415.

The supporting protrusions 415 provided at the entrance of the light guide mounting portion 400a as described above, further, have the effect of preventing the light guide 413 from being separated from the light guide mounting portion 400a even when subjected to vibration or shock during, e.g., transportation of the scanner module 40 or of a variety of appliances in which the scanner module 40 is included.

As a result of performing a drop test from a height of 30 cm, simulating a drop that may be experienced by the scanner module 40 during transport, under several conditions of different numbers of supporting protrusions 415, the light guide 413 was separated from the light guide mounting portion 400a when two supporting protrusions 415 were provided, but remained in the light guide mounting portion 400a when three supporting protrusions 415 were provided. Accordingly, it is preferable that three or more supporting protrusions 415 be formed to protect against external vibration or shock, in order to prevent the light guide 413 from being separated from the light guide mounting portion 400a of the scanner module body 400.

Referring again to FIG. 12, a reflecting face 413d provided at the light guide 413 has a convex and concave pattern. With this configuration, a part of the light, irradiated from the light emitting diodes 411b and introduced into the light guide 413, may leak from the reflecting face 413d of the light guide 413 to the outside, causing light loss. Therefore, a reflecting plate 418 is disposed at the rear side of the reflecting face 413d of the light guide 413, to reflect the light, leaked from the reflecting face 413d to the outside of the light guide 413, toward the reflecting face 413d, so as to allow the reflected light to be again introduced into the light guide 413 through the reflecting face 413d. In the present embodiment, a pair of light guides 413 are provided and therefore, a pair of reflecting plates 418 are provided such that the reflecting plates 418 are provided at the rear side of the reflecting faces 413d of the pair of light guides 413, respectively. A supporting piece 418a is formed at one side of each reflecting plate 418, to be supported on one side of the light guide 413. Through the supporting piece 418a, the reflecting plate 418 can be stably mounted in the corresponding light guide mounting portion 400a.

While an embodiment is described above to include an elastic member 414, in the form of a metal leaf spring, to elastically supports the light guide 413 and the light source 411, the present invention is not so limited. For example, an elastic member 514, made of an elastic resin material such as rubber, may alternatively be used as shown in FIG. 20.

Figure 20:
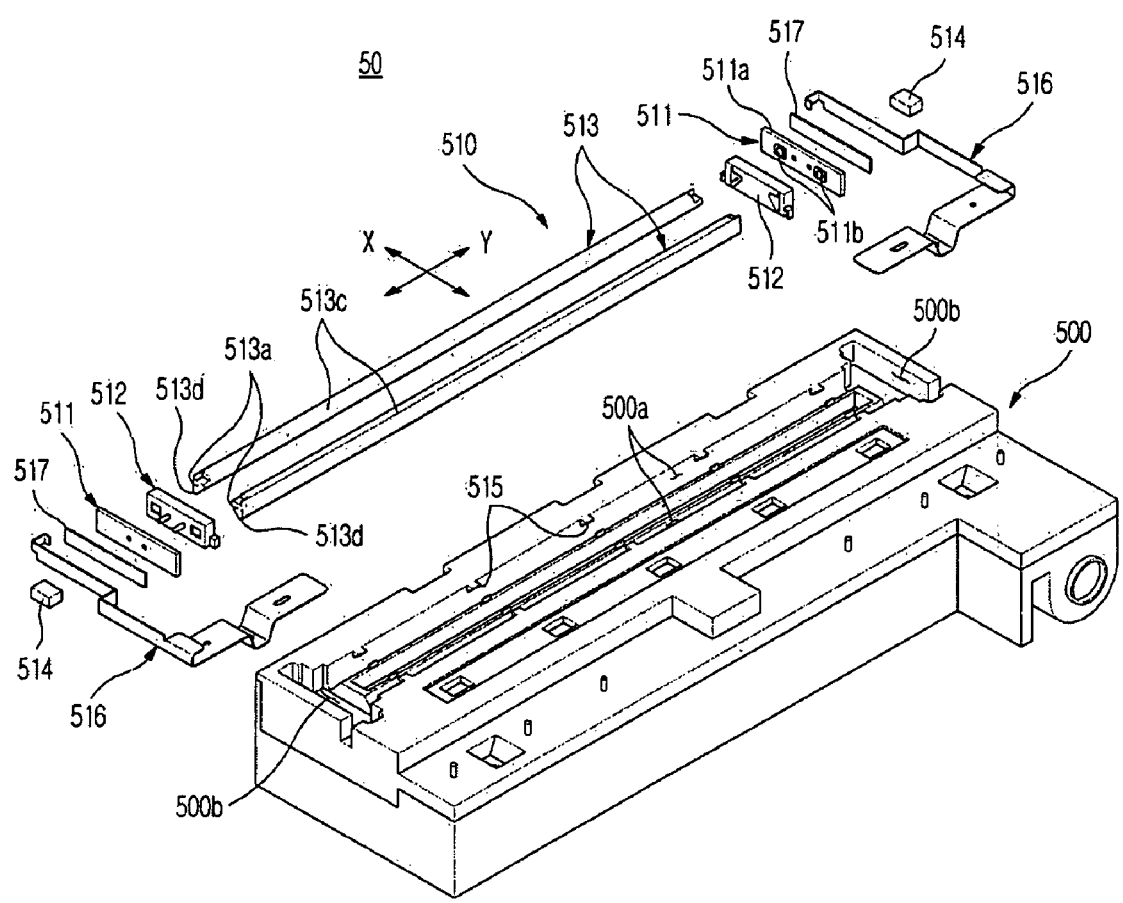
FIG. 20 is an exploded perspective view illustrating a scanner module including an illuminator in accordance with a fifth embodiment of the present invention.

Referring to FIG. 20, the elastic resin member 514 may exhibit poor thermal conductivity, and may not be as effective in removing the heat generated by the light source 511. In an embodiment, a radiating member 516, made of material that has a sufficiently high thermal conductivity, may be provided between the elastic member 514 and the light source 511.

One end of the radiating member 516 may be located between the elastic member 514 and the light source 511 while the other end of the radiating member 516 extends out of a light source mounting portion 500b, and is mounted to a portion of the scanner module body 500. The heat generated from the light source 511 is transferred along the radiating member 516, and is radiated via heat exchange with air outside the light source mounting portion 500b. As a result, heat generated from the light source 511 can be radiated.

In the above-described configuration, thermal conductivity between the light source 511 and the radiating member 516 is proportional to the contact area between the light source 511 and the radiating member 516. When facing surfaces of the light source 511 and the radiating member 516 are not flat and thus, have a relatively small contact area between them, a thermal coupling 517 may be provided between the light source 511 and the radiating member 516 to enhance the transfer of heat generated from the light source 511 to the radiating member 516. The thermal coupling 517 may be made of a material exhibiting high thermal conductivity, and may be configured to closely contact both facing surfaces of the light source 511 and the radiating member 516. The thermal coupling 517 can indirectly maximize the contact area between the light source 511 and the radiating member 516, and, consequently, can allow heat generated from the light source 511 to be effectively transmitted to and radiated by the radiating member 516.

Figure 9:
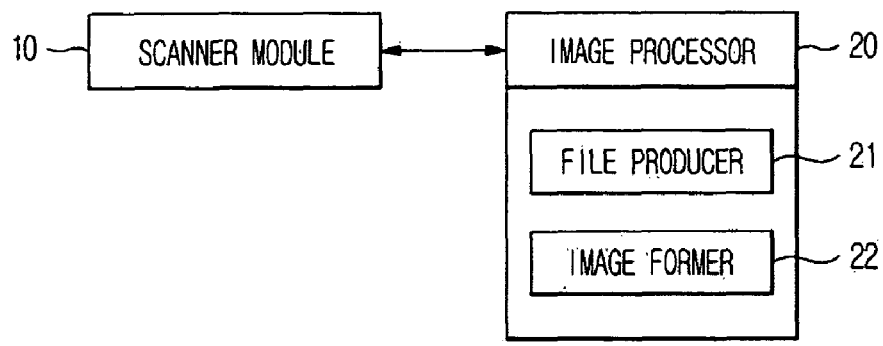
FIG. 9 is a block diagram illustrating an image scanning apparatus employing a scanner module in accordance with an embodiment of the present invention.

FIG. 9 is a block diagram illustrating an image scanning apparatus employing a scanning module, various embodiments of which have been described above. Referring to the drawing, the image scanning apparatus may include the scanner module 10, and an image processor 20 to process an image obtained from the scanner module 10. Here, the image scanning apparatus in accordance with the present invention may include, e.g., a Multi-Functional Printer (MFP), a digital copier, a scanner, a facsimile, or the like.

The scanner module 10 is substantially identical to the embodiments variously described above, a detailed description of which need not be repeated. The image processor 20 may include at least one of a file producer 21 to produce an image file from an image obtained from the sensor unit 130 (FIG. 1) and an image former 22 to form an image on a printing medium on the basis of the obtained image.

The file producer 21 may be, e.g., a controller that may also control operations of various components of the image scanning apparatus, including, e.g., the scanner module. To this end, according to an embodiment, the controller may be, e.g., a microprocessor, a microcontroller or the like, that includes a CPU to execute one or more computer instructions to implement the various control operations of the scanning apparatus, and may further include a memory device, e.g., a Random Access Memory (RAM), Read-Only-Memory (ROM), a flesh memory, or the like, to store the one or more computer instructions. The method in which the controller controls various components of an image scanning apparatus is similar to that of well-known image scanning apparatuses, detailed description thereof is thus unnecessary.

The image former 22 may include one or more of components of an image forming apparatus, for example, of an electro-photographic printing apparatus, that includes, e.g., a printing medium feeding unit that holds, picks up and feeds printing medium, an exposure unit for drawing a latent image using light on a photosensitive surface, a developing unit to develop the latent image with toner, a transfer unit to transfer the toner image onto the printing medium, a fixing unit to fuse the toner image sufficiently permanently on the printing medium and a discharging unit for discharging a printing medium on which an image has been fixed. As known to those skilled in the art, there are many available and known other various image forming mechanisms.

While the above embodiments are generally described in references to examples of a charge coupled device module (CCDM) type scanner module, in which a light source and a plurality of reflecting mirrors constitute a single module, the present invention is also applicable to other types of scanning module, including, e.g., a Mirror Moving Type (MMT), in which a light source and a single reflecting mirror constitute one module and two reflecting mirrors constitute another module.

Although embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An image scanning apparatus, comprising:
    a scanning module that comprises:
    an illuminator configured to illuminate a light on an object to be scanned;
    a sensor configured to detect the light reflected downward by the object,
    wherein the illuminator comprises:
        a pair of light emitting diodes each configured to produce the light;
        a light guide having an elongated shape with a pair of incidence faces each formed on a corresponding one of longitudinal ends thereof, the light from each of the pair of light emitting diodes being incident on respective one of the pair of the incidence faces, the light guide being configured to change a direction of the light received through the pair of incidence faces; and
        a pair of light source holders to which a respective one of the pair of light emitting diodes is mounted, at least one of the pair of light source holders having a surface arranged to face a respective one of the pair of incidence faces of the light guide, the surface of the at least one of the pair of light source holders being configured reflect light incident thereupon, and
    wherein the light guide has a first side, a second side, and a third side connecting the first side and the second side, the third side configured to emit light from the light guide to the object to be scanned, and each of the first, second, and third sides extending between the longitudinal ends of the light guide, and
    a first plane corresponding to a surface of the first side of the light guide forms an acute angle with a second plane corresponding to a surface of the second side of the light guide.

2. The image scanning apparatus according to claim 1, wherein the surface of the light source holder is substantially white so as to reflect and diffuse light incident thereupon.

3. The image scanning apparatus according to claim 1, wherein the light guide includes a reflecting face to reflect the light irradiated from the light emitting diode.

4. The image scanning apparatus according to claim 3, wherein the reflecting face has a light reflecting pattern.

5. The image scanning apparatus according to claim 3, further comprising:
    a reflecting plate disposed at the rear side of the reflecting face of the light guide, to allow the light, leaked from the light guide, to be introduced into the light guide.

6. The image scanning apparatus according to claim 5, wherein the reflecting plate is white to reflect and diffuse light.

7. A scanning module for use in an image scanning apparatus to scan an object, comprising:
    an illuminator configured to illuminate a light on the object to be scanned; and
    a sensor configured to detect the light reflected downward by the object,
    wherein the illuminator comprises:
        a light emitting diode configured to produce the light;
        a light guide having an elongated shape having a length extending along a first direction, the light guide including an incidence face formed on at least one of longitudinal ends thereof to receive the light into the light guide from the light emitting diode, the light guide being configured to change a direction of the light received through the incidence face; and
        a light source holder to which the light emitting diode is mounted, the light source holder having a surface arranged to face the incidence face of the light guide, the surface of the light source holder being configured reflect light incident thereupon, and
    wherein the light guide has a first side, a second side, and a third side connecting the first side and the second side, the third side configured to emit light from the light guide to the object to be scanned, and each of the first, second, and third sides extending between the longitudinal ends of the light guide, and
    a first plane corresponding to a surface of the first side of the light guide forms an acute angle with a second plane corresponding to a surface of the second side of the light guide.

8. The scanning module according to claim 7, wherein the surface of the light source holder is substantially white so as to reflect and diffuse light incident thereupon.

9. The scanning module according to claim 7, wherein the light guide includes a reflecting face to reflect the light irradiated from the light emitting diode.

10. The scanning module according to claim 9, wherein the reflecting face has a light reflecting pattern.

11. The scanning module according to claim 9, further comprising: a reflecting plate disposed at the rear side of the reflecting face of the light guide, to allow the light, leaked from the light guide, to be introduced into the light guide.

12. The scanning module according to claim 11, wherein the reflecting plate is white to reflect and diffuse light.

13. The image scanning apparatus according to claim 1, wherein when a surface of the object to be scanned defines a third plane, neither one of the first and second planes is perpendicular to the third plane, and
    neither one of the first and second planes is parallel to the third plane.

14. The image scanning apparatus according to claim 13, wherein the first plane forms a first acute angle with respect to the third plane, and
    the second plane forms a second acute angle with respect to the third plane greater than the first acute angle.

* * * * *